US008226529B2

(12) United States Patent
Rothenbuhler et al.

(10) Patent No.: US 8,226,529 B2
(45) Date of Patent: Jul. 24, 2012

(54) CONTROLLER OF CONTINUOUSLY VARIABLE TRANSMISSION, FLOW CONTROL METHOD, AND FLOW CONTROLLER

(75) Inventors: Yves Rothenbuhler, Chavannes-près-Renens (CH); Shigeo Kamamoto, Kashiwara (JP)

(73) Assignee: JTEKT Corporation, Osaka-Shi, Osaka (JP)

( * ) Notice: Subject to any disclaimer, the term of this patent is extended or adjusted under 35 U.S.C. 154(b) by 554 days.

(21) Appl. No.: 12/311,604

(22) PCT Filed: Oct. 19, 2007

(86) PCT No.: PCT/JP2007/070458
§ 371 (c)(1),
(2), (4) Date: Apr. 6, 2009

(87) PCT Pub. No.: WO2008/050687
PCT Pub. Date: May 2, 2008

(65) Prior Publication Data
US 2010/0035721 A1 Feb. 11, 2010

(30) Foreign Application Priority Data

Oct. 23, 2006 (JP) .................................. 2006-287256
Mar. 27, 2007 (JP) .................................. 2007-082256

(51) Int. Cl.
*F16H 15/38* (2006.01)
*F16H 61/664* (2006.01)
(52) U.S. Cl. ........................................... 477/50; 477/45

(58) Field of Classification Search ..................... 477/45, 477/46, 48–50
See application file for complete search history.

(56) References Cited

U.S. PATENT DOCUMENTS

| | | | |
|---|---|---|---|
| 4,715,258 | A | 12/1987 | Shigematsu et al. |
| 4,999,774 | A | 3/1991 | Tokoro et al. |
| 5,643,116 | A | 7/1997 | Genzel et al. |
| 5,871,411 | A | 2/1999 | Senger et al. |
| 6,146,294 | A | 11/2000 | Bolz |
| 2004/0254047 | A1 | 12/2004 | Frank et al. |

FOREIGN PATENT DOCUMENTS

| | | |
|---|---|---|
| DE | 44 40 278 C1 | 11/1995 |
| EP | 0 712 003 A2 | 5/1996 |
| JP | 4-54363 | 2/1992 |
| JP | 8-226929 | 9/1996 |
| JP | 2606350 | 2/1997 |
| JP | 2000-500850 | 1/2000 |
| JP | 2005-28915 | 2/2005 |
| WO | WO 98/12457 | 3/1998 |

OTHER PUBLICATIONS

European Search Report dated Feb. 8, 2011.
European Search Report dated Aug. 9, 2010.

*Primary Examiner* — Justin Holmes
(74) *Attorney, Agent, or Firm* — McGinn IP Law Group PLLC

(57) ABSTRACT

A sensor is placed in proximity to a chain of a continuously variable transmission, and a pulse is output by detecting pins. Moreover, there is provided a control section that determines theoretical speed of the chain from numbers of input and output rotations of the continuously variable transmission; that determines actual speed of the chain from an output from the sensor; that determines slippage from the speeds; and that controls clamping force of the continuously variable transmission so as to make slippage close to a reference value.

13 Claims, 8 Drawing Sheets

2 ENGINE
21 SERVO AMPLIFIER
19 SERVO AMPLIFIER
24 MAIN CONTROLLER

106 LOAD
112 SERVO PUMP
110 CONTROL SECTION
111 REFERENCE VALUE SETTING SECTION

START
S1 INITIALIZE
S2 COMPUTE THEORETICAL SPEED
S3 COMPUTE ACTUAL SPEED
S4 COMPUTE SLIPPAGE
POSITIVE
NEGATIVE
S6 INCREASE CLAMPING FORCE
S7 DECREASE CLAMPING FORCE

2 ENGINE
21 SERVO AMPLIFIER
19 SERVO AMPLIFIER
24 MAIN CONTROLLER

32 FEEDFORWARD CONTROL SECTION
31 PLANT
34 OBSERVER

Flow Rate

Time

Rotational Speed

Time

Rotational Speed

First Electric Motor

Second Electric Motor

Time

CONTROLLER OF CONTINUOUSLY VARIABLE TRANSMISSION, FLOW CONTROL METHOD, AND FLOW CONTROLLER

TECHNICAL FIELD

The present invention relates to a controller of a continuously variable transmission using a chain or a belt and to a flow rate control method and a flow rate controller for controlling a quantity of flow to a servo pump in order to change a transmission gear ratio of; for instance, a continuously variable transmission of an automobile.

BACKGROUND ART

Slippage of a chain or a belt in a continuously variable transmission (CVT) can be detected by sensing axial displacement of a pulley with a position sensor. For instance, a transmission gear ratio determined from the width of a drive pulley detected by a position sensor through arithmetic operation is compared with an actual transmission gear ratio computed from the number of rotations of each of drive pulleys and driven pulleys, and occurrence of slippage can be detected on the basis of whether or not a difference between the ratios is equal to a predetermined value or greater (see; for instance, JP-A-2005-28915). Slippage can also be controlled by adjusting clamping force of a pulley.

Proposed in Japanese Patent No. 2606350 is an apparatus serving as a transmission of a related-art belt-type CVT.

In the apparatus of this type, a pair of hydraulic actuators are provided for changing an effective diameter of a primary pulley and that of a secondary pulley. There is provided a control valve for controlling a pressure of the hydraulic actuator that generates clamping force for the primary pulley, and there is provided a relief valve for controlling a hydraulic pressure of the hydraulic actuator that generates clamping force for the secondary pulley.

DISCLOSURE OF THE INVENTION

Problem that the Invention is to Solve

However, high-precision detection of axial displacement of a pulley is not easy, and slippage control cannot be accurately performed without high-precision detection of displacement. Further, high-precision detection involves consumption of much manufacturing cost.

A valve for setting to a predetermined value a pressure supplied to a hydraulic actuator relevant to a transmission gear ratio of a CVT is employed in related-art common control, and a hydraulic pump for supplying hydraulic oil to the hydraulic actuator is linked to the engine of a vehicle.

The hydraulic pump is arranged so as to ensure a sufficient pressure under every condition; therefore, the pump entails a great energy loss and is not preferable in terms of energy saving.

In light of the related-art drawbacks, the present invention aims at providing a controller of a continuously variable transmission capable of readily realizing high-precision slippage control and curtailing manufacturing cost.

The present invention additionally aims at providing a flow rate control method and a flow rate controller for a servo pump of a continuously variable transmission that can simplify system control and is suitable for energy saving.

Means for Solving the Problem

A controller of a continuously variable transmission of the present invention comprising:

a pair of detectors for detecting number of input rotations and number of output rotations of the continuously variable transmission, respectively;

a sensor that is positioned in proximity to a chain or a belt of the continuously variable transmission and that outputs pulses stemming from periodic changes which are present in the chain or belt in its lengthwise direction; and a control section that determines theoretical speed of the chain or belt in accordance with numbers of input and output rotations of the continuously variable transmission, that determines actual speed of the chain or belt in accordance with an output from the sensor, that determines slippage from the speeds, and that controls clamping force of the continuously variable transmission so as to make slippage close to a reference value.

In the controller of such a continuously variable transmission, the control section determines actual speed of the chain or belt in accordance with outputs from the sensor positioned in proximity to the chain or belt; determines slippage from theoretical speed and the actual speed, and controls clamping force of the continuously variable transmission so as to make slippage close to a reference value.

Moreover, in the controller of the continuously variable transmission, the essential requirement is to place the sensor opposite a position where the chain or belt always passes by regardless of a transmission gear ratio of the continuously variable transmission.

In this case, even when a change arises in a stretched pattern of the chain or belt because of a shift, the sensor can output pulses without fail.

According to the controller of the continuously variable transmission of the present invention, the control section determines actual speed from an output from the sensor disposed in close proximity to the chain or belt; determines slippage from the theoretical speed and the actual speed; and controls clamping force of the continuously variable transmission so as to make slippage close to a reference value. Accordingly, high-precision slippage control can be readily realized, and manufacturing cost can be curtailed.

In the meantime, the inventors of the present invention paid attention to the fact that the servo pump system can be applied to control of the continuously variable transmission. Specifically, the inventors acquired findings that pressure required by the hydraulic actuator can be set by the quantity of flow supplied to the hydraulic actuator by means of a servo pump.

The present invention has been conceived on the basis of the findings and provides a method for controlling a quantity of flow to a servo pump in a continuously variable transmission, the method comprising the steps of controlling a transmission gear ratio of a continuously variable transmission by means of a hydraulic fluid supplied to a hydraulic actuator; controlling the quantity of hydraulic fluid supplied to the hydraulic actuator by the electric motor; and effecting state feedback control in such a way that a quantity of hydraulic fluid supplied to the hydraulic actuator comes to a target quantity of flow, by use of a state variable of a state variable model of a servo pump system that takes as an input a voltage input to the servo amplifier of the electric motor or a state quantity exhibiting a linear relationship with the input voltage.

The servo pump is driven by the electric motor, and the quantity of flow to the servo pump is proportional to the rotational speed "w" of the electric motor. Specifically, the quantity of flow Q to the servo pump is represented by Equation (1) provided below provided that the displacement volume of the servo pump is $D_V$ and the volume efficiency of the servo pump is $\eta_V$.

$$Q = D_V \cdot w \cdot \eta_V \tag{1}$$

The rotational speed "w" of the electric motor is set by an input voltage $V_{set}$ input to the servo amplifier of the electric motor. The rotational speed "w" of the electric motor is expressed in the form of a quadric like Equation (2) provided below by use of a constant K that is obtained from an experiment or through analysis using a detailed model of a motor-inverter.

$$w(s) = K \cdot [1/(a \cdot s^2 + b \cdot s + 1)] \cdot V_{set} \quad (2)$$

From Equations (1) and (2), we have $$Q = G \cdot [1/(a \cdot s^2 + b \cdot s + 1)] \cdot V_{set} \quad (3)$$

where $G = D_V \cdot \eta_V \cdot K$ (4)

An equation of state space is represented by Equations (5-1) and (5-2).

[Mathematical Expression 2]

$$\frac{dx}{dt} = \begin{bmatrix} 0 & 1 \\ -\frac{1}{a} & -\frac{b}{a} \end{bmatrix} \cdot x + \begin{bmatrix} 0 \\ \frac{G}{a} \end{bmatrix} \quad (5\text{-}1)$$

$$y = [1 \; 0] \cdot x \quad (5\text{-}2)$$

The input vector "u" is $u = V_{set}$; the output vector "y" is $y = Q$; and the state variable vector "x" is $x = [Q \; dQ/dt]^T$.

The state variable model of the servo pump system is thus prepared, and a state feedback is used, so that stability of flow control can be enhanced. Namely, an apparent dynamic element can be withdrawn through the state feedback, by utilization of an internal state of the plant, whereby dynamic compensation can be realized. As a consequence, stability of flow control can be assured.

Further, it is possible to enhance the response of flow control by setup of positions of polarities of state feedback. Namely, polarities of a closed loop system can be placed at arbitrarily desirable positions on a complex plane by use of a given linear combination of state variables.

Moreover, a valve and a pressure sensor that have hitherto been used in the related art can be decommissioned, and the hydraulic circuit can be simplified. Further, the essential requirements for the respective servo pumps are to operate as required and supply a required quantity of flow neither too much nor too little; hence, an attempt can be made to achieve energy saving.

For instance, drive currents of electric motors are available as state quantities expressing a linear relationship with the input voltages.

Further, when the observer is configured by use of the state variable model and when the state variable is estimated by means of the observer, the accuracy of estimation of a state variable can be effectively enhanced, as a result of which a servo system employing state feedback can be well designed. Moreover, the state feedback system with a merged observer also yields an advantage of the capability of designing observer control independently of design of state feedback control (separation of the design of the observer).

Moreover, the present invention provides a flow rate controller of a servo pump of a continuously variable transmission comprising a continuously variable transmission that includes an input rotary element, an output rotary element, and a power transmission element for transmitting power to a point between the input rotary element and the output rotary element and that can continuously change a transmission gear ratio by changing a contact diameter between the input rotary element and the power transmission element and a contact diameter between the output rotary element and the power transmission element by means of a hydraulic actuator; a servo pump that is driven by an electric motor for supplying a hydraulic fluid to the hydraulic actuator; and a controller for controlling the servo pump, wherein the controller has a function of effecting state feedback control in such a way that a quantity of hydraulic fluid supplied to the hydraulic actuator comes to a target quantity of flow, by use of a state variable of a state variable model of a servo pump system that takes as an input a voltage input to the servo amplifier of the electric motor or a state quantity exhibiting a linear relationship with the input voltage.

In this case, the stability and responsiveness of flow control can be enhanced. Further, a valve that has hitherto been used in the related art can be decommissioned, and the hydraulic circuit can be simplified. Further, the essential requirements for the respective servo pumps are to operate as required and supply a required quantity of flow neither too much nor too little; hence, an attempt can be made to achieve energy saving. For instance, when leakage of a hydraulic circuit, and the like, can be ignored under a stable condition, at least one of the servo pumps can be held in a standstill.

7 The controller includes an observer configured by use of the state variable model. When the observer estimates a state variable, the accuracy of estimation of the state variable can be effectively enhanced, as a result of which the servo system can be well designed by means of state feedback. In a state feedback system with a merged observer, the design of the observer can be performed separately from the design of state feedback.

The input rotary element is a primary pulley having a variable diameter (6); the output rotary element is a secondary pulley having a variable diameter (7); the power transmission element is a belt or chain passed around the primary pulley and the secondary pulley (8); the hydraulic actuator includes a first hydraulic actuator (11) for changing a contact diameter between the primary pulley and the power transmission element and a second hydraulic actuator (14) for changing a contact diameter between the secondary pulley and the power transmission element; the servo pump includes a first servo pump (15) and a second servo pump (16); a primary quantity of flow ($Q_P$) acting as a quantity of hydraulic fluid supplied to the first hydraulic actuator is a quantity of flow discharged by the first servo pump; and a secondary quantity of flow ($Q_S$) acting as a quantity of hydraulic fluid supplied to the second hydraulic actuator is quantity of flow ($Q_S = Q_{SP} - Q_P$) determined by subtracting the quantity of flow discharged by the first servo pump from a quantity of flow discharged by the second servo pump.

In this case, the second servo pump acts on both the first hydraulic actuator and the second hydraulic actuator, thereby controlling the clamping force exerted on a belt, or the like, in the primary pulley and the secondary pulley. The first servo pump adjusts a pressure difference between the first and second hydraulic actuators, thereby controlling a transmission gear ratio of the continuously variable transmission.

When viewed as a pure hydraulic system, the servo pump system is made analogous as a multi-input and multi-output (MIMO) linear model. Specifically,

[Mathematical Expression 2]

$$\frac{dx}{dt} = \begin{bmatrix} 0 & 1 & 0 & 0 \\ -\frac{1}{a_P} & -\frac{b_P}{a_P} & 0 & 0 \\ 0 & 0 & 0 & 1 \\ 0 & 0 & -\frac{1}{a_S} & -\frac{b_S}{s_S} \end{bmatrix} \cdot x + \begin{bmatrix} 0 & 0 \\ \frac{G_P}{a_P} & 0 \\ 0 & 0 \\ 0 & \frac{G_S}{a_S} \end{bmatrix} \cdot u \quad (6\text{-}1)$$

$$y = \begin{bmatrix} 1 & 0 & 0 & 0 \\ -1 & 0 & 1 & 0 \end{bmatrix} \cdot x \quad (6\text{-}2)$$

In Equation (6-1), respective coefficients $a_P$, $b_P$, $G_p$ are coefficients of Equation (3) in connection with the first servo pump, and respective coefficients $a_S$, $b_S$, $G_S$ are coefficients of Equation (3) in connection with the second servo pump.

The state variable vector "x," the input vector "u," and the output vector "y" are respectively represented by Equations (7-1), (7-2), and (7-3) as below.

$$x = [Q_P \, dQ_P/dt \, Q_{SP} \, dQ_{SP}/dt]^T \quad (7\text{-}1)$$

$$u = [V_{set,S} \, V_{set,P}]^T \quad (7\text{-}2)$$

$$y = [Q_P Q_S]^T \quad (7\text{-}3)$$

An observer can be configured by use of, in principle, the state variable model of the plant acquired by Equations (6-1) and (6-2). It is desirable that positions of the polarities of the system be determined at locations where sufficient stability and dynamic characteristics of the system (transient response pertaining to the following of a target value, and the like) be attained, by means of a simulation test using an actual machine. However, in order to use the observer for controlling a continuously variable transmission, responsiveness of the hydraulic actuator must be especially faster than responsiveness of the continuously variable transmission.

A branch is placed at any position along an oil passage that connects the second servo pump with the second hydraulic actuator, and the first servo pump is placed at a position along an oil passage that connects the branch to the first hydraulic actuator (claim 6). As a result, it becomes substantially possible to take the primary flow as the quantity of flow discharged by the first servo pump and to take the secondary flow as the quantity of flow discharged by the first servo pump from the quantity of flow discharged by the second servo pump.

DESCRIPTIONS OF THE REFERENCE NUMERALS

101 CONTINUOUSLY VARIABLE TRANSMISSION
104 CHAIN
107, 108 SENSOR (DETECTING DEVICE)
109 SENSOR
110 CONTROL SECTION
1 CONTINUOUSLY VARIABLE TRANSMISSION
2 ENGINE
3 INPUT SHAFT
5 OUTPUT SHAFT
6 PRIMARY PULLEY (INPUT ROTATIONAL ELEMENT)
7 SECONDARY PULLEY (OUTPUT ROTATIONAL ELEMENT)
8 BELT (POWER TRANSMISSION ELEMENT)
11 FIRST HYDRAULIC ACTUATOR
14 SECOND HYDRAULIC ACTUATOR
17 OIL PASSAGE
17a BRANCH
18 OIL PASSAGE
19 FIRST SERVO AMPLIFIER
20 FIRST ELECTRIC MOTOR
21 SECOND SERVO AMPLIFIER
22 SECOND ELECTRIC MOTOR
23 CONTROLLER
30 SERVO PUMP SYSTEM
31 PLANT
34 OBSERVER
35 STATE FEEDBACK CONTROL SECTION
37 STATE FEEDBACK GAIN MULTIPLICATION SECTION
$Q_P$ PRIMARY QUANTITY OF FLOW, QUANTITY OF FLOW TO FIRST SERVO PUMP
$Q_{P,R}$ TARGET QUANTITY OF FLOW (FOR PRIMARY FLOW)
$Q_S$ SECONDARY QUANTITY OF FLOW
$Q_{S,R}$ TARGET QUANTITY OF FLOW (FOR SECONDARY FLOW)
$Q_{SP}$ QUANTITY OF FLOW TO SECOND SERVO PUMP
$V_{set,P}$ VOLTAGE INPUT TO FIRST SERVO AMPLIFIER
$V_{set,S}$ VOLTAGE INPUT TO FIRST SERVO AMPLIFIER
R1, R2 CONTACT DIAMETER
u INPUT VECTOR (INPUT)
x STATE VARIABLE VECTOR
y OUTPUT VECTOR (OUTPUT)

BEST MODES FOR IMPLEMENTING THE INVENTION

Preferable embodiments of the present invention will be described by reference to the accompanying drawings.

First Embodiment

Figure 1:
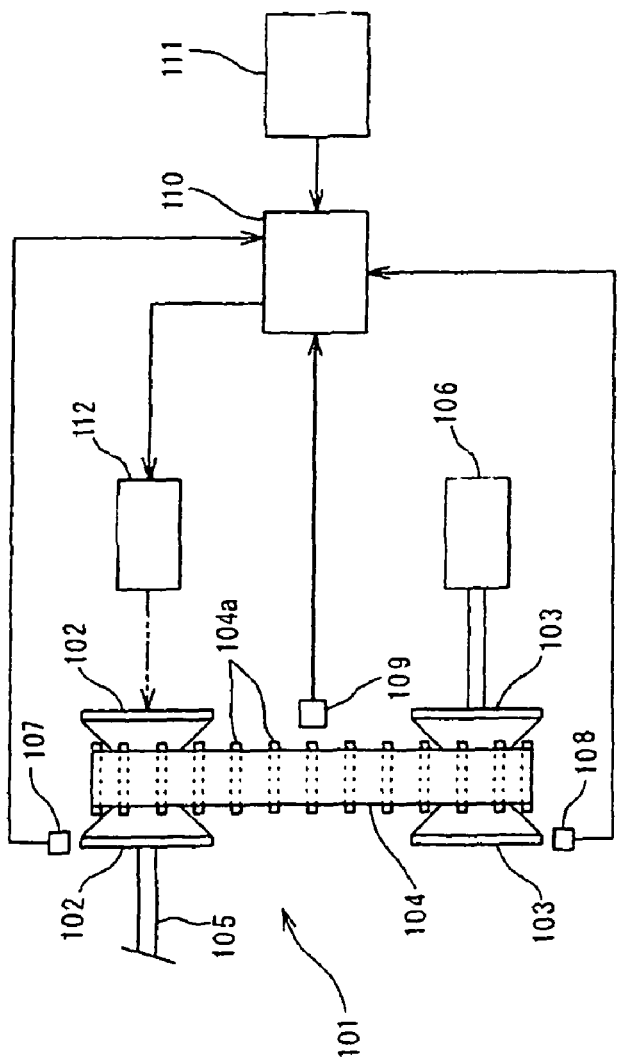
FIG. 1 is a block circuit diagram showing a controller of a continuously variable transmission (CVT) of a first embodiment of the present invention.

FIG. 1 is a block circuit diagram showing a controller of a continuously variable transmission (CVT) of a first embodiment. In the drawing, a continuously variable transmission 101 has a chain 104 for power transmission purpose that is stretched between a drive pulley 102 and a driven pulley 103. Pins 104a are placed at given intervals on the chain 104 in its lengthwise direction. The drive pulley 102 is connected to a drive shaft 105 of the engine. In the meantime, the driven pulley 103 is connected to a load 106 of a vehicle (not shown).

Sensors 107 and 108, each of which detects the number of rotations of a pulley, are disposed at positions in proximity to respective outer peripheries of the drive pulley 102 and the driven pulley 103. The sensors 107, 108 each are sensors that detect magnetic variations and output a pulse appropriate to the number of rotations by detecting; for instance, irregularities (not shown) provided at uniform intervals on an outer periphery of a pulley in its circumferential direction.

Figure 3:
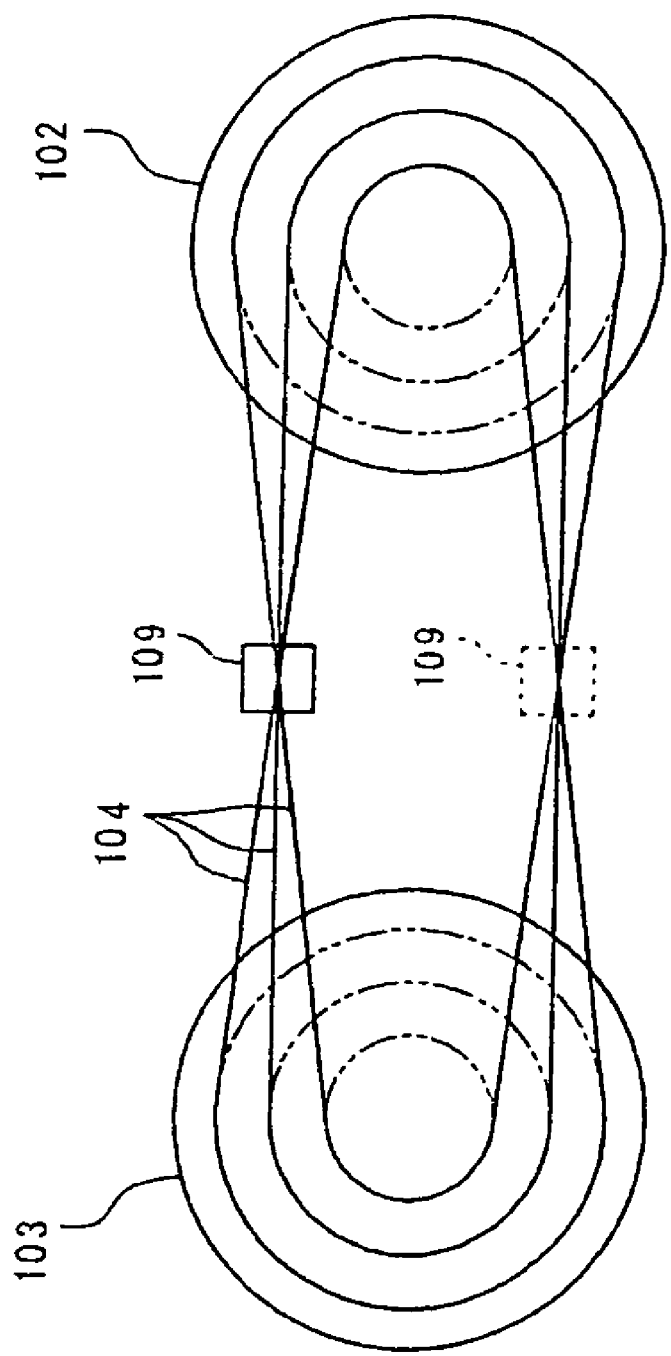
FIG. 3 is a schematic view of pulleys and chains when viewed sideways.

A sensor 109 for detecting actual speed of the chain is provided opposite a side surface of the chain 104. The sensor 109 is a sensor for detecting; for instance, variations in magnetic resistance and outputs a pulse in accordance with periodic variations in magnetic resistance arising between a time at which the sensor closely opposes one of the pins 104a provided at the predetermined interval on the chain in its lengthwise direction and a time at which the sensor opposes a space between adjacent two pins. FIG. 3 is a schematic view of the respective pulleys 102 and 103 and the chain 104 when viewed sideways. A pattern of extension of the chain 104 is changed by changes in transmission gear ratio. However, it is possible to detect passage of the pins 104a and output a pulse, so long as (a detection face of) the sensor 109 is placed so as to face an illustrated position by which the chain 104 passes regardless of a transmission gear ratio. The position of the sensor 109 may also be a lower location indicated by a broken line.

Turning back to FIG. 1, pulses output from the sensors 107 to 109 are input to a control section 110. A reference value setting section 111 can set reference value, which will be described later, in the control section 110. Upon receipt of a command from the control section 110, the servo pump 112 adjusts clamping force of the chain 104 generated by the drive pulley 102.

Figure 2:
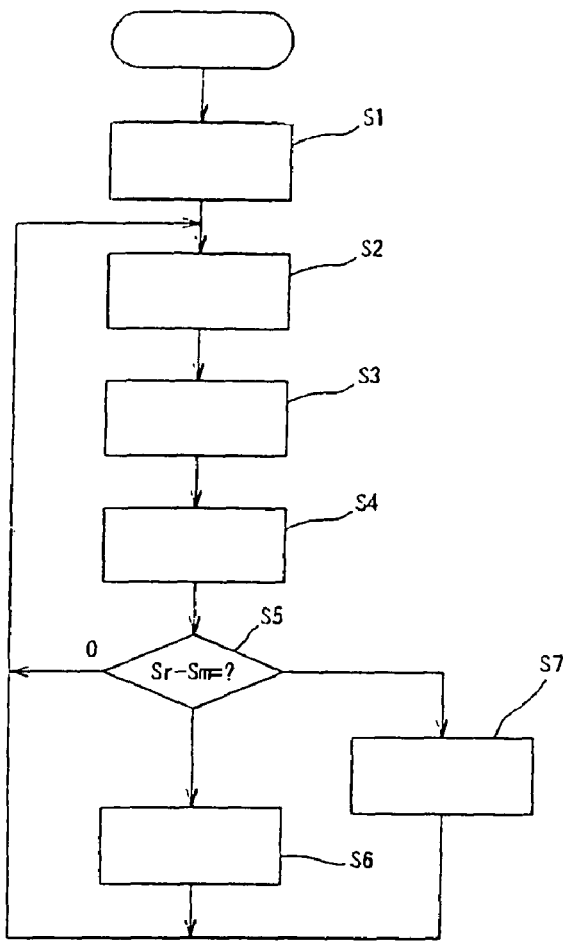
FIG. 2 is a flowchart showing operation of a control section.

Operation of the control section 110 will now be described by reference to a flowchart shown in FIG. 2. First, in step S1, the control section 110 initializes stored values. Subsequently, the control section 110 determines the numbers of rotations of the drive pulley 102 and the driven pulley 103 in accordance with signals from the sensor 107 and 108; and computes theoretical speed of the chain 104 achieved at this time (step S2). The control section 110 further computes actual speed of the chain 104 in accordance with a signal from the sensor 109 (step S3) and determines slippage Sm from a difference between a computed value $V_0$ of the theoretical speed and a computed value V of the actual speed by means of $$Sm = (V_0 - V)/V_0$$

(step S4). Next, the controls section 110 compares a reference value Sr of slippage set by the reference value setting section 111 with the above-described slippage Sm (step S5). Processing returns to step S2 when there is obtained Sr−Sm=0 or Sr=Sm, and similar processing is iterated.

In the meantime, when a difference of Sr−Sm is positive; namely, slippage Sm, is under the reference value Sr, the control section 110 drives the servo pump 112, thereby reducing clamping force of the chain 104 by a given amount (step S7). Slippage Sm is increased by virtue of a reduction in clamping force. Subsequently, processing pertaining to steps S2 to S5 and S7 is iterated. Processing for reducing clamping force ends at a point in time at which Sr=Sm is attained.

Conversely, when a result of SR−Sm is negative; namely, when slippage Sm exceeds the reference value Sr, the control section 110 drives the servo pump 112, thereby increasing the clamping force of the chain 104 by only a given amount (step S6). The slippage Sm decreases as a result of an increase in clamping force. Subsequently, processing pertaining to steps S2 through S6 is iterated, and processing for increasing the clamping force ends when Sr=Sm is achieved.

Thus, the clamping force is always adjusted in such a way that a relationship of Sr=Sm is achieved. In general, the efficiency of power transmission is closely relevant to slippage, and the most superior efficiency and fuel consumption are achieved by holding slippage at an appropriate value (=the reference value Sr). For instance, slippage Sr=1.5% is preferable.

The controller of the continuously variable transmission, such as that mentioned above, enables easy, high-precision detection of actual speed of the chain on the basis of an output from the sensor positioned in proximity to the chain. Moreover, since theoretical speed is based on the number of rotations of the respective pulleys 102 and 103, the speed is accurate. Therefore, slippage is determined from the theoretical speed and the actual speed, and the clamping force of the continuously variable transmission is controlled so as to make the slippage close to a reference value. Thus, high-precision slippage control can be readily realized, and manufacturing cost can also be cut down.

Although the chain is used as a continuously variable transmission of the embodiment, a change can be detected with a sensor even when a belt is used, so long as the change is periodic and exists in the belt in its lengthwise direction. In relation to the sensor, an optical sensor as well as a sensor detecting magnetic variations can also be used.

The embodiment adopts the configuration in which the sensors 107 and 108 are placed at positions along the outer peripheries of the respective pulleys 102 and 103 in order to detect the numbers of rotations of the respective pulleys 102 and 103 and in which the control section 110 processes outputs from the sensors. However, the invention is not limited to the configuration. The essential requirement is that there are provided detecting devices which detect the number of input rotations and the number of output rotations of a continuously variable transmission.

Second Embodiment

Figure 4:
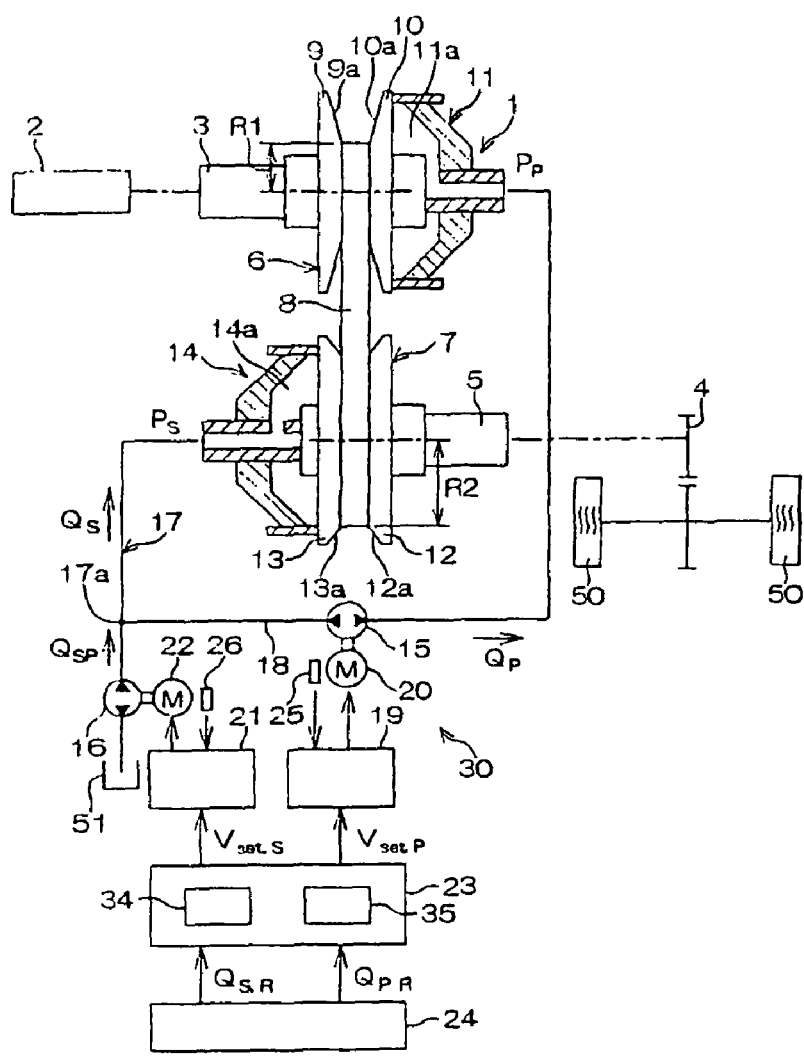
FIG. 4 is a schematic view of a vehicle equipped with a continuously variable transmission to which a flow rate control method and a flow rate controller for a servo pump of a second embodiment of the present invention are applied.

FIG. 4 is a schematic view of a vehicle equipped with a continuously variable transmission to which a flow rate control method and a flow rate controller for a servo pump of a second embodiment of the present invention are applied.

The continuously variable transmission 1 includes an input shaft 3 that is joined to an output shaft of an engine 2 so as to be able to transmit torque; an output shaft 5 joined to drive wheels 50 by way of a gear train 4 so as to be able to transmit torque; a primary pulley 6 that serves as an input rotational element provided on the input shaft 3 so as to be simultaneously rotatable and that has a variable diameter; a secondary pulley 7 that serves as an output rotary element provided on the output shaft 5 so as to be simultaneously rotatable and that has a variable diameter; and a belt 8 that serves as a power transmission element passed around the primary pulley 6 and the secondary pulley 7. A chain may also be used in lieu of the belt 8.

The primary pulley 6 has a stationary sheave 9 and a movable sheave 10 that are rotatable simultaneously with the input shaft 3. Axial movement of the stationary sheave 9 with respect to the input shaft 3 is restrained, whereas axial movement of the movable sheave 10 with respect to the input shaft 3 is allowed. The belt 8 is clamped in a power-transmittable manner between a power transmission surface 9a of the stationary sheave 9 and a power transmission surface 10a of the movable sheave 10. A first hydraulic actuator 11 is provided on the rear of the movable sheave 10. A hydraulic pressure $P_P$ of an oil chamber 11a of the first hydraulic actuator 11 impels the movable sheave 10 toward the stationary sheave 9.

The secondary pulley 7 includes a stationary sheave 12 and a movable sheave 13 that are provided so as to be rotatable simultaneously with the output shaft 5. Axial movement of the stationary sheave 12 with respect to the output shaft 5 is restrained, whereas axial movement of the movable sheave 13 with respect to the output shaft 5 is allowed. The belt 8 is clamped in a power-transmittable manner between a power transmission surface 12a of the stationary sheave 12 and a power transmission surface 13a of the movable sheave 13. A second hydraulic actuator 14 is provided on the rear of the movable sheave 13. A hydraulic pressure $P_S$ of an oil chamber 14a of the second hydraulic actuator 14 impels the movable sheave 13 toward the stationary sheave 12.

The first and second actuators 11 and 1 change the contact radius R1 between the primary pulley 6 and the belt 8 and the contact radius R2 between the secondary pulley 7 and the belt 8, thereby enabling continuous changing of the transmission gear ratio of the continuously variable transmission 1.

The continuously variable transmission 1 has a first servo pump 15 and a second servo pump 16. A primary quantity of flow $Q_P$ that is a quantity of flow of a hydraulic fluid fed to the first hydraulic actuator 11 is equivalent to the quantity of flow discharged from the first servo pump 15. The quantity of flow to the first servo pump 15 is also represented by $Q_P$ in the following descriptions.

A secondary quantity of flow $Q_S$ that is the quantity of flow of a hydraulic fluid fed to the second hydraulic actuator 14 is the quantity of flow determined by subtracting the quantity of flow $Q_P$ discharged from the first servo pump 15 from the quantity of flow $Q_{S,P}$ discharged from the second servo pump 16; namely, $$Q_S = Q_{SP} - Q_P$$

Specifically, a branch 17a is placed at any position along an oil passage 17 that connects the second servo pump 16 with the second hydraulic actuator 14, and the first servo pump 15 is placed at a position along the oil passage 18 that connects the branch 17a to the first hydraulic actuator 11. An inlet of the second servo pump 16 is connected to an oil tank 51.

The first servo pump 15 is driven by a first electric motor 20 (a servo motor) that is supplied with electric power from a first servo amplifier 19, and the second servo pump 16 is driven by a second electric motor 22 (a servo motor) that is supplied with electric power from a second servo amplifier 21.

A main controller 24 that performs centralized control of a drive system including the vehicle engine 2 imparts a target quantity of flow $Q_{P,R}$ of hydraulic fluid to be supplied to the first hydraulic actuator 11 (corresponding to a target value of the primary quantity of flow $Q_P$) and a target quantity of flow $Q_{S,R}$ of hydraulic fluid to be supplied to the second hydraulic actuator 14 (corresponding to a target value of the secondary quantity of flow $Q_S$) to a controller 23 that controls the quantities of flow to the servo pumps 15 and 16 of the continuously variable transmission 1.

In accordance with the target quantity of flow $Q_{P,R}$ and the target quantity of flow $Q_{S,R}$, the controller 23 controls a voltage $V_{set,P}$ input to the first servo amplifier 19 and a voltage $V_{set,S}$ input to the second servo amplifier 21, thereby controlling the primary quantity of flow $Q_P$ and the secondary quantity of flow $Q_S$.

The second servo pump 16 functions so as to act on both the first hydraulic actuator 11 and the second hydraulic actuator 14, thereby controlling the clamping force exerted on the belt 8 in the primary pulley 6 and the secondary pulley 7. The first servo pump 15 functions so as to control the transmission gear ratio of the continuously variable transmission 1 by adjusting a differential pressure $(P_P - P_S)$ between the first and second hydraulic actuators 11 and 14.

There is constructed a servo pump system 30 that includes the continuously variable transmission 1, the first and second servo pumps 15 and 16, the controller 23, and the like, and that controls the quantities of flow to the servo pumps 15 and 16 in order to change the transmission gear ratio of the continuously variable transmission 1. The controller 23 is provided with an observer 34 for estimating a state variable to be described later and a state feedback control section 35 that controls state feedback by use of a state variable estimated by the observer 34.

Figure 5:
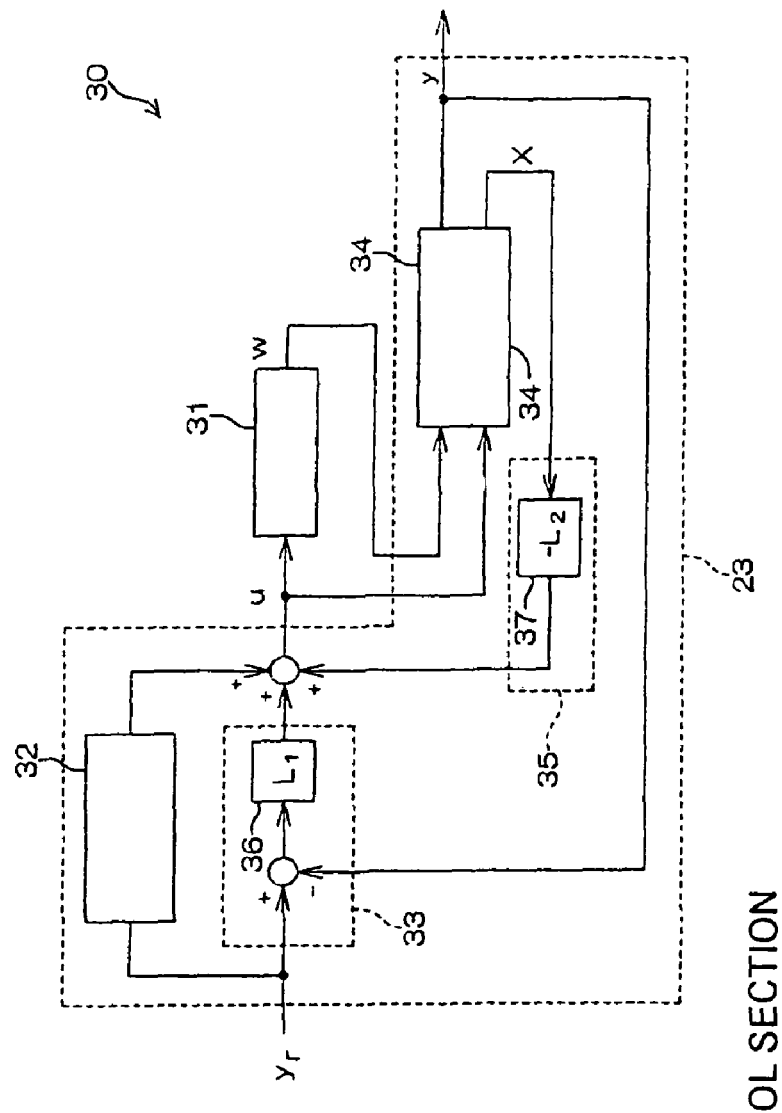
FIG. 5 is a block diagram of a servo pump system.

FIG. 5 is a block diagram representing the servo pump system 30. The servo pump system 30 has a plant 31 that is an object of control; a feedforward control section 32; a main feedback control section 33; an observer 34; and a state feedback controls section 35 based on a modern control theory.

The quantity of flows $Q_P$, $Q_{SP}$ of the respective servo pumps 15 and 16 are proportional to respective rotational speeds of the corresponding electric motors 19 and 21. The servo amplifiers 19 and 21 perform speed control (control the number of rotations) by feeding back signals output from rotational speed sensors 25 and 26 accommodated in the corresponding electric motors 19 and 21. The servo amplifiers 19 and 21 regulate control currents to the electric motors 19 and 21 by feeding back signals output from current sensors (not shown) that detect dive currents for the corresponding electric motors 19 and 21.

Since the quantity of flows $Q_P$ and $Q_{SP}$ to the respective servo pumps 15 and 16 can originally be detected by use of the rotational speed sensors 25 and 26 provided in the electric motors 19 and 21, there is no necessity for providing a sensor for separately detecting the quantity of flow.

The main feedback control section 33 has a main feedback gain multiplication section 36 that multiplies a main feedback gain $L_1$ by a deviation $(y_r - y)$ between a target flow $y_r$ and an output "y" from the observer 34.

The observer 34 is in principle built by use of a state variable model equivalent to a plant 31. An input vector "u" and an output vector "w" (corresponding to the rotational speed of the electric motor) from the plant 31 are input to the observer, and the observer estimates a state variable vector "x" and an output vector "y" and outputs them.

The state feedback control section 35 has a state feedback gain multiplication section 37 that multiplies the state variable vector "x" estimated by the observer 34 by a predetermined state feedback gain $(-L_2)$.

A principle state variable model for constructing the observer 34 will now be described.

First, the quantity of flow Q to the servo pump is proportional to the rotational speed "w" of the electric motor that drives the servo pump. Specifically, the quantity of flow Q to the servo pump is represented by Equation (1) provided below provided that the displacement volume of the servo pump is $D_v$ and the volume efficiency of the servo pump is $\eta_v$ $$Q = D_v \cdot w \cdot \eta_v \quad (1)$$

In the meantime, the rotational speed "w" of the electric motor is set by an input voltage $V_{set}$ input to the servo amplifier of the electric motor. The rotational speed "w" of the electric motor 20 is expressed in the form of a quadric like Equation (2) provided below by use of a constant K that is obtained from an experiment or through analysis using a detailed model of a motor-inverter.

$$w(s) = K \cdot [1/(a \cdot s^2 + b \cdot s + 1)] \cdot V_{set} \quad (2)$$

From Equations (1) and (2), we have $$Q = G \cdot [1/(a \cdot s^2 + b \cdot s + 1)] \cdot V_{set} \quad (3)$$

where $G = D_v \cdot \eta_v \cdot K$ \quad (4)

An equation of state space is

[Mathematical Expression 1]

$$\frac{dx}{dt} = \begin{bmatrix} 0 & 1 \\ -\frac{1}{a} & -\frac{b}{a} \end{bmatrix} \cdot x + \begin{bmatrix} 0 \\ \frac{G}{a} \end{bmatrix} \quad (5\text{-}1)$$

$$y = [1 \ 0] \cdot x \quad (5\text{-}2)$$

The input vector "u" is $u = V_{set}$; the output vector "y" is $y = Q$; and the state variable vector "x" is $x = [Q \ dQ/dt]^T$.

When viewed as a pure hydraulic system, the servo pump system 30 applied to the continuously variable transmission 1 shown in FIG. 4 is made analogous as a multi-input and multi-output (MIMO) linear model. Specifically,

[Mathematical Expression 3]

$$\frac{dx}{dt} = A \cdot x + B \cdot u \quad (8\text{-}1)$$

$$y = C \cdot x \quad (8\text{-}2)$$

$$A = \begin{bmatrix} 0 & 1 & 0 & 0 \\ -\frac{1}{a_P} & -\frac{b_P}{a_P} & 0 & 0 \\ 0 & 0 & 0 & 1 \\ 0 & 0 & -\frac{1}{a_S} & -\frac{b_S}{s_S} \end{bmatrix} \quad (8\text{-}3)$$

$$B = \begin{bmatrix} 0 & 0 \\ \frac{G_P}{a_P} & 0 \\ 0 & 0 \\ 0 & \frac{G_S}{a_S} \end{bmatrix} \quad (8\text{-}4)$$

$$C = \begin{bmatrix} 1 & 0 & 0 & 0 \\ -1 & 0 & 1 & 0 \end{bmatrix} \quad (8\text{-}5)$$

In Equations (8-3) and (8-4), respective coefficients $a_P$, $b_P$, $G_p$ are coefficients of Equation (3) in connection with the first servo pump 15, and respective coefficients $a_S$, $b_S$, $G_S$ are coefficients of Equation (3) in connection with the second servo pump 16.

The state variable vector "x," the input vector "u," and the output vector "y" are respectively represented by Equations (9-1), (9-2), and (9-3) as below.

$$x = [Q_P \, dQ_P/dt \, Q_{SP} \, dQ_{SP}/dt]^T \quad (9\text{-}1)$$

$$u = [V_{set,S} \, V_{set,P}]^T \quad (9\text{-}2)$$

$$y = [Q_P \, Q_S]^T \quad (9\text{-}3)$$

When the quantity of flow $Q_{SP}$ to the second servo pump 16 serving as a clamping pump that imparts clamping force for the belt 8 to the respective variable diameter pulleys 6 and 7 is taken as a constant, variations in the voltage $V_{set,P}$ input to the servo amplifier 19 of the first servo pump 15 acting as a speed-change pump (corresponding to variations in rotational speed of the electric motor 20) affect both the primary quantity of flow $Q_P$ and the secondary quantity of flow $Q_S$.

When the primary quantity of flow $Q_P$ corresponding to the quantity of flow to the first servo pump 15 is taken as a constant, variations in the voltage $V_{set,S}$ input to the servo amplifier 21 of the second servo pump 16 affect the secondary quantity of flow $Q_S$ but do not affect the primary quantity of flow $Q_P$.

Figure 6:
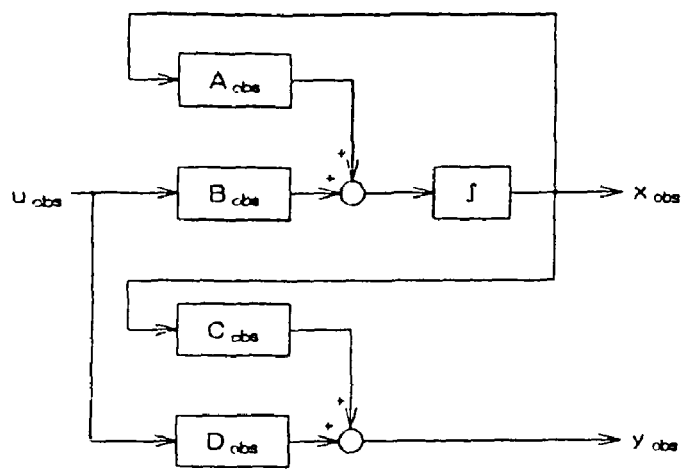
FIG. 6 is a block diagram of an observer.

The observer 34 is to estimate the state variation vector "x" and the output vector "y" by use of the input "u" and the rotational speed "w" of the electric motor (an actually measured value or an estimated value). In principle, the observer corresponds to a state variable model acquired by use of Equations (8-1) and (8-2) serving as the equations of state. Specifically, a block diagram of the observer 34 is shown in; for instance, FIG. 6.

Here, the input vector $u_{obs}$ is $u_{obs} = [u \ w]^T$ and dimensionally differs from the state variable model of the plant 31 in connection with respective matrices $A_{obs}$, $B_{obs}$, and $C_{obs}$.

The state variable model of the servo pump system 30 is thus prepared, and a state feedback is used, so that stability of flow control can be enhanced. Namely, an apparent dynamic element can be withdrawn through the state feedback, by utilization of an internal state of the plant 31, whereby dynamic configuration can be realized. As a consequence, stability of flow control can be assured.

A system shown in FIG. 5 is a regulator system using state feedback and the observer. An internal circuit performs control operation so as to maintain the internal state of the plant at zero at all times, and an external circuit controls an output from the plant in order to prevent occurrence of a problem of regulation, such as that seen in a servo pump.

Further, it is possible to enhance the response of flow control by setup of positions of polarities of state feedback. Namely, polarities of a closed loop system can be placed at arbitrarily desirable positions on a complex plane by use of a given linear combination of state variables.

Moreover, a valve and a pressure sensor that have hitherto been used in the related art can be decommissioned, and the hydraulic circuit can be simplified. Further, the essential requirements for the respective servo pumps 15 and 16 are to operate as required and supply a required quantity of flow neither too much nor too little; hence, an attempt can be made to achieve energy saving. For instance, when leakage of a hydraulic circuit, and the like, can be ignored under a stable condition, at least one of the servo pumps 15 and 16 can be held in a standstill.

Further, since the observer 34 is configured by use of the state variable model and since the state variable is estimated by means of the observer 34, the accuracy of estimation of a state variable can be effectively enhanced, as a result of which a servo system employing state feedback can be well designed. The state feedback system with the merged observer 34 also yields an advantage of the capability of designing the observer 34 independently of design of the state feedback control section 35.

It is desirable that positions of the polarities of the servo pump system 30 be determined at locations where sufficient stability and dynamic characteristics of the system (transient response pertaining to the following of a target value, and the like) be attained, by means of a simulation test using a test machine (an actual machine may also be acceptable, or a simulator into which an actual machine is modeled, and the like, is also acceptable). The response must be fast to such an extent that a dynamic characteristic of an actuator (corresponding to the servo pumps 15 and 16 in the present servo pump system 30) can be ignored.

Although the rotational speed sensors 25 and 26 of the electric motors 20 and 22 are used in the second embodiment, the observer 34 may also perform estimation in a case where the electric motors 20 and 22 are not equipped with the rotational speed sensors.

Further, the voltages $V_{set,P}$ and $V_{set,S}$ input to the servo amplifiers 19 and 21 are used as inputs to the servo pump system in the second embodiment. However, drive currents of the electric motors 20 and 22, which are state quantities expressing a linear relationship with the input voltages $V_{set,P}$ and $V_{set,S}$ of the servo amplifiers 19 and 21, may also be used in lieu of the input voltages.

In the second embodiment, an explanation has been provided pursuant to the example in which the continuously variable transmission 1 is a belt-drive-type continuously variable transmission. However, the present invention may also be applied to a so-called toroidal-type continuously variable transmission in which an input rotary element is an input disk; in which an output rotary element is an output disk; and in which a power transmission element is a roller sandwiched between the input disk and the output disk.

In addition, the present invention is susceptible to various alterations within the scope of the claims of the present invention.

Example

In relation to the servo pump system 30 described in connection with the second embodiment, the test is conducted until a sufficient dynamic characteristic of flow control is attained, and polarities of a closed loop system are arranged at desirable positions.

Figure 7:
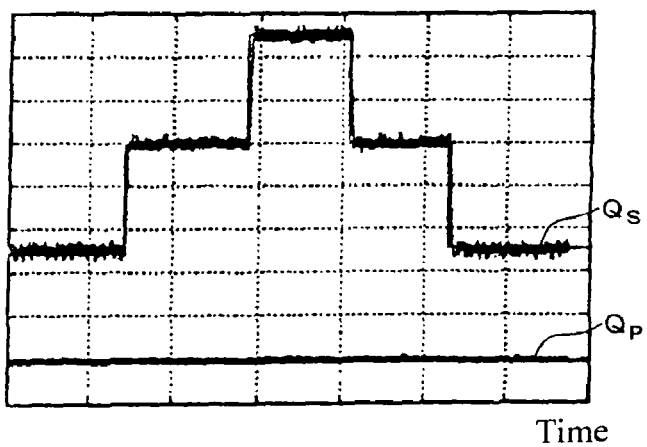
FIG. 7 is a flow rate variation diagram showing responsiveness of a flow rate.
Figure 8:
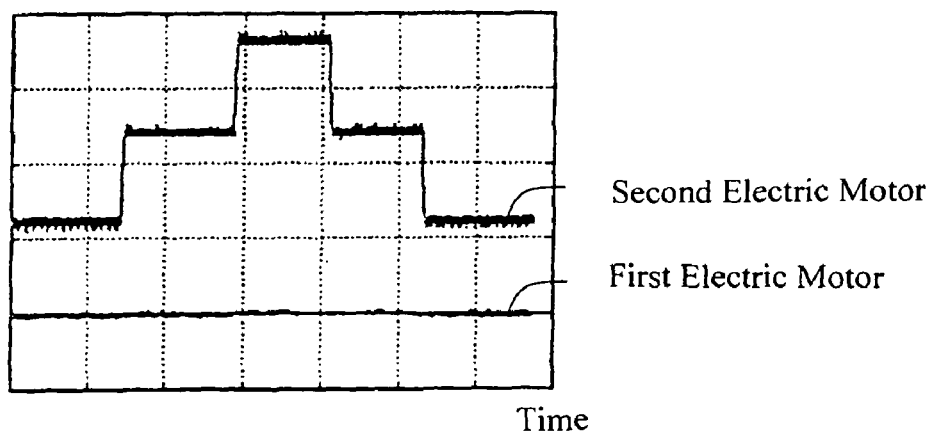
FIG. 8 is a variation diagram of rotational speed of an electric motor corresponding to responses shown in FIG. 6.

As a consequence, the thus-acquired dynamic characteristic is shown in FIGS. 7 through 10. In FIG. 7, the primary quantity of flow $Q_P$ is maintained at zero at all times, and step response is applied to the secondary quantity of flow $Q_S$. FIG. 8 is a view corresponding to FIG. 7, showing the rotational speed of the electric motor 20 of the first servo pump 15 and the rotational speed of the electric motor 22 of the second servo pump 16.

Figure 9:
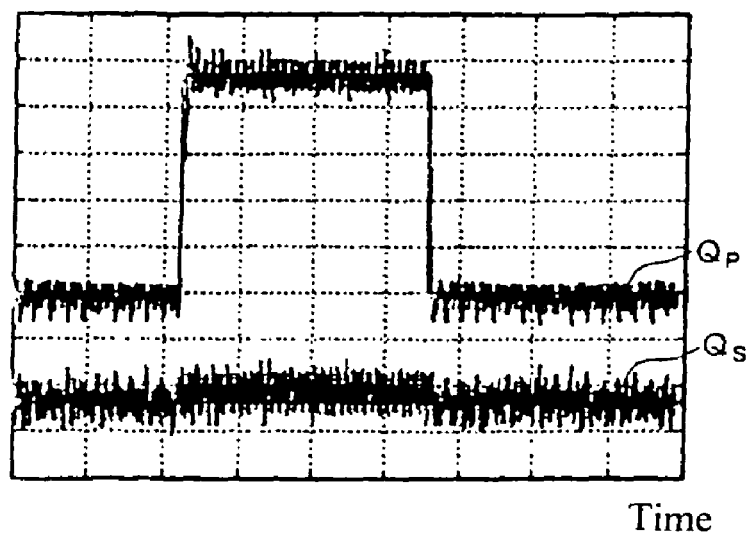
FIG. 9 is a flow rate variation diagram showing responsiveness of a flow rate.
Figure 10:
FIG. 10 is a variation diagram of rotational speed of an electric motor corresponding to responses shown in FIG. 8.

In FIG. 9, the secondary quantity of flow $Q_S$ is maintained at zero at all times, and step response is applied to the primary quantity of flow $Q_P$. FIG. 10 is a view corresponding to FIG. 9, showing the rotational speed of the electric motor 20 of the first servo pump 15 and the rotational speed of the electric motor 22 of the second servo pump 16.

When there is a request for an increase in the primary quantity of flow $Q_P$, the second servo pump 16 serving as a clamping pump increases the rotational speed of the corresponding electric motor 22 with a view toward constantly maintaining the quantity of flow to the second hydraulic actuator 14.

FIGS. 7 through 10 verify that the controller of the servo pump system 30 is stable and that the system is a noninteracting system as a multi-input and multi-output system (specifically, a two-input and two-output system). Moreover, response of the system is found to have speed sufficient for neglecting the dynamic characteristic of the actuator.

The invention claimed is:

1. A method for controlling a quantity of flow to a servo pump in a continuously variable transmission, the method comprising:

controlling a transmission gear ratio of the continuously variable transmission by a hydraulic fluid supplied to a hydraulic actuator;

controlling a quantity of hydraulic fluid supplied to the hydraulic actuator by the servo pump driven by an electric motor; and effecting state feedback control in such a manner that the quantity of hydraulic fluid supplied to the hydraulic actuator comes to a target quantity of flow, by use of a state variable of a state variable model of a servo pump system that takes as an input a voltage input to a servo amplifier of the electric motor or a state quantity exhibiting a linear relationship with the input voltage.

2. The method according to claim 1, wherein an observer is configured by use of the state variable model, and the state variable is estimated by the observer.

3. A flow rate controller comprising:

a continuously variable transmission which includes an input rotary element, an output rotary element, and a power transmission element for transmitting power between the input rotary element and the output rotary element and which can continuously change a transmission gear ratio by changing a contact diameter between the input rotary element and the power transmission element and a contact diameter between the output rotary element and the power transmission element by a hydraulic actuator;

a servo pump which is driven by an electric motor for supplying a hydraulic fluid to the hydraulic actuator; and a controller for controlling the servo pump, wherein the controller effects state feedback control in such a manner that a quantity of hydraulic fluid supplied to the hydraulic actuator comes to a target quantity of flow, by use of a state variable of a state variable model of a servo pump system that takes as an input a voltage input to a servo amplifier of the electric motor or a state quantity exhibiting a linear relationship with the input voltage.

4. The flow rate controller according to claim 3, wherein the controller includes an observer configured by use of the state variable model, and the observer estimates the state variable.

5. The flow rate controller according to claim 3, wherein:

the input rotary element comprises a primary pulley having a variable diameter;

the output rotary element comprises a secondary pulley having a variable diameter;

the power transmission element comprises a belt or chain passed around the primary pulley and the secondary pulley;

the hydraulic actuator includes a first hydraulic actuator for changing the contact diameter between the primary pulley and the power transmission element and a second hydraulic actuator for changing the contact diameter between the secondary pulley and the power transmission element;

the servo pump includes a first servo pump and a second servo pump;

a primary quantity of flow which is a quantity of hydraulic fluid supplied to the first hydraulic actuator is a quantity of flow discharged by the first servo pump; and a secondary quantity of flow which is a quantity of hydraulic fluid supplied to the second hydraulic actuator is a quantity of flow determined by subtracting the quantity of flow discharged by the first servo pump from a quantity of flow discharged by the second servo pump.

6. The flow rate controller according to claim 5, wherein a branch is placed at a position along an oil passage that connects the second servo pump to the second hydraulic actuator; and
the first servo pump is placed at a position in an oil passage that connects the branch to the first hydraulic actuator.

7. The flow rate controller according to claim 4, wherein:
the input rotary element comprises a primary pulley having a variable diameter;
the output rotary element comprises a secondary pulley having a variable diameter;
the power transmission element comprises a belt or chain passed around the primary pulley and the secondary pulley;
the hydraulic actuator includes a first hydraulic actuator for changing the contact diameter between the primary pulley and the power transmission element and a second hydraulic actuator for changing the contact diameter between the secondary pulley and the power transmission element;
the servo pump includes a first servo pump and a second servo pump;
a primary quantity of flow, which is a quantity of hydraulic fluid supplied to the first hydraulic actuator, is a quantity of flow discharged by the first servo pump; and
a secondary quantity of flow which is a quantity of hydraulic fluid supplied to the second hydraulic actuator is a quantity of flow determined by subtracting the quantity of flow discharged by the first servo pump from a quantity of flow discharged by the second servo pump.

8. The method according to claim 1, wherein the state variable model of the servo pump system takes as the input the voltage input to the servo amplifier of the electric motor or a drive current of the electric motor.

9. The method according to claim 1, wherein the state variable model of the servo pump system takes as the input the voltage input to the servo amplifier of the electric motor.

10. The method according to claim 1, wherein the state variable model of the servo pump system takes as the input a drive current of the electric motor.

11. The flow rate controller according to claim 3, wherein the state variable model of the servo pump system takes as the input the voltage input to the servo amplifier of the electric motor or a drive current of the electric motor.

12. The flow rate controller according to claim 3, wherein the state variable model of the servo pump system takes as the input the voltage input to the servo amplifier of the electric motor.

13. The flow rate controller according to claim 3, wherein the state variable model of the servo pump system takes as the input a drive current of the electric motor.

* * * * *